US012642180B2

(12) United States Patent
Stallin et al.

(10) Patent No.: US 12,642,180 B2
(45) Date of Patent: Jun. 2, 2026

(54) METHODS AND SYSTEMS TO MEASURE AND MAINTAIN CONSISTENT WIDTH OF WINDROWER HARVESTED STOCKS

(71) Applicant: DEERE & COMPANY, Moline, IL (US)

(72) Inventors: Saravanan Stallin, Chennai (IN); Manoj Issrani, Pune (IN)

(73) Assignee: Deere & Company, Moline, IL (US)

( * ) Notice: Subject to any disclaimer, the term of this patent is extended or adjusted under 35 U.S.C. 154(b) by 467 days.

(21) Appl. No.: 18/197,217

(22) Filed: May 15, 2023

(65) Prior Publication Data

US 2024/0381813 A1 Nov. 21, 2024

(51) Int. Cl.
*A01D 57/26* (2006.01)
*G01B 21/06* (2006.01)
*G01B 21/08* (2006.01)

(52) U.S. Cl.
CPC ............. *A01D 57/26* (2013.01); *G01B 21/06* (2013.01); *G01B 21/08* (2013.01)

(58) Field of Classification Search
CPC ................................ A01D 57/26; G01B 21/06
See application file for complete search history.

(56) References Cited

U.S. PATENT DOCUMENTS

| | | | |
|---|---|---|---|
| 11,350,568 B2 | 6/2022 | Isaac et al. | |
| 11,432,464 B2 | 9/2022 | Hayashi et al. | |
| 2010/0251686 A1* | 10/2010 | Giovannini | A01D 78/144 56/367 |

| | | | |
|---|---|---|---|
| 2017/0013772 A1* | 1/2017 | Kirk | A01F 15/071 |
| 2018/0325028 A1 | 11/2018 | Rotole et al. | |
| 2019/0110389 A1 | 4/2019 | Kirk et al. | |
| 2020/0205345 A1 | 7/2020 | Bollinger et al. | |
| 2021/0037713 A1* | 2/2021 | McClure | A01F 15/0833 |

(Continued)

FOREIGN PATENT DOCUMENTS

| | | | | |
|---|---|---|---|---|
| EP | 2850934 B1 | * | 7/2017 | A01D 80/00 |
| EP | 3062594 B1 | * | 3/2018 | A01B 69/003 |

(Continued)

OTHER PUBLICATIONS

English Translation of ES-2928928-T3 (Year: 2022).*

(Continued)

*Primary Examiner* — Claude J Brown
(74) *Attorney, Agent, or Firm* — Taft Stettinius & Hollister LLP; Stephen F. Rost

(57) ABSTRACT

A cut stock measurement system and method for a work machine that cuts stock. The cut stock measurement system includes distance sensors that generate distance measurements to the cut stock, and a geolocation unit that generates a machine geolocation. The system computes a stock width measurement, and a stock geolocation. The distance sensors can include left and right distance sensors coupled to the left and right sides of the machine, or coupled to left and right foldable arms. The foldable arms can be coupled to the machine, and have ends that trail the machine as it moves forward. An adjustable leveling apparatus with left and right leveling blades can be coupled to the left and right foldable arms with a hinge pin in-between. Left and right leveling mechanisms can adjust heights of the left and right leveling blades above the ground.

20 Claims, 7 Drawing Sheets

(56)  References Cited

U.S. PATENT DOCUMENTS

2021/0267121 A1 * 9/2021 Childs ...................... G01J 3/50
2022/0386533 A1   12/2022 Hill et al.

FOREIGN PATENT DOCUMENTS

| EP | 3571918 B1 | * | 3/2021 | ......... A01D 41/1243 |
| EP | 3892085 A1 | * | 10/2021 | ......... A01D 78/1085 |
| ES | 2928928 T3 | * | 11/2022 | ............. G01F 22/00 |
| WO | WO-2020037003 A1 | * | 2/2020 | ......... A01D 41/1278 |

OTHER PUBLICATIONS

English Translation of EP-2850934-B1 (Year: 2017).*
English Translation of EP-3892085-A1 (Year: 2021).*
Extended European Search Report and Written Opinion issued in European Patent Application No. 24173347.6 dated Jan. 3, 2025, in 07 pages.

* cited by examiner

1000

Monitor sensor data — 1010

Determine row width — 1020

Determine row location — 1030

Send row width data to display — 1040

Upload row data — 1050

Row width critical low? — 1060

No

Yes

Notify operator — 1070

METHODS AND SYSTEMS TO MEASURE AND MAINTAIN CONSISTENT WIDTH OF WINDROWER HARVESTED STOCKS

FIELD OF THE DISCLOSURE

The present disclosure relates to agricultural harvesting machines, and more specifically relates to systems and methods for uniform distribution of windrower harvested stock.

BACKGROUND

A typical baling operation sequence is to use a windrower to cut stock and distribute it for drying, and then later to use a baler to collect the dry stock and create/pack bales. The stock cut by windrowers does not typically have an even distribution. The cut stock can vary in height and width based on field conditions, crop conditions and other factors. Often the cut stock is thicker or higher in the middle, and thinner or lower towards the sides. This uneven thickness or height of the cut stock can result in uneven moisture content of the cut stock when the baling operation occurs. Excess moisture in the middle of the cut stock can cause excess waiting time between the cutting and baling operations, or early baling of the still moist stock which can result in stock decay and loss. Uneven width of the cut stock can result in stock being missed by the baler, or bales having uneven density across their width.

It would be desirable to have the windrower leave a more even distribution of cut stock in height and/or width to increase the efficiency and effectiveness of the cutting and baling operations.

SUMMARY

A cut stock measurement system for a work machine is disclosed. The cut stock measurement system includes distance sensors, a geolocation unit and a processor. The distance sensors generate distance measurements between the work machine and the cut stock. The geolocation unit receives global positioning signals, and generates a machine geolocation. The processor receives the distance measurements and the machine geolocation, computes a stock width measurement for the cut stock based on the distance measurements, and computes a stock geolocation based on the distance measurements and the machine geolocation. The processor can also compare the stock width measurement to a critical low row width threshold, and generate a notification when the stock width measurement is less than the critical low row width threshold.

The plurality of distance sensors can include left and right distance sensors. The left distance sensor can be coupled to a left side of the work machine, can generate distance measurements between the left distance sensor and a left side of the cut stock. The right distance sensor can be coupled to a right side of the work machine, and can generate distance measurements between the right distance sensor and a right side of the cut stock. The left distance sensor can be coupled to a stationary portion of a left rear wheel mount of the work machine, and the right distance sensor can be coupled to a stationary portion of a right rear wheel mount of the work machine.

The cut stock measurement system can also include left and right foldable arms. The left foldable arm can have a proximal end coupled to the work machine, and a distal end that trails the work machine on a left side as the work machine moves in a forward direction. The right foldable arm can have a proximal end coupled to the work machine, and a distal end that trails the work machine on a right side as the work machine moves in the forward direction. The distance sensors can include a left and right distance sensors coupled to the left and right foldable arms, respectively, where the left distance sensor generates distance measurements between the left distance sensor and a left side of the cut stock, and the right distance sensor generates distance measurements between the right distance sensor and a right side of the cut stock. The left foldable arm can be coupled to a left rear wheel mount of the work machine, and the right foldable arm can be coupled to a right rear wheel mount of the work machine.

The cut stock measurement system can also include a leveling apparatus with left and right leveling blades. The left leveling blade can include a proximal end coupled to the left foldable arm and a distal end coupled to a hinge pin. The right leveling blade can include a proximal end coupled to the right foldable arm and a distal end coupled to the hinge pin. An angle between the left and right leveling blades can be adjustable by moving one of the left and right leveling blades relative to the other at the hinge pin. The leveling apparatus can include a left leveling mechanism coupled to the left foldable arm, and a right leveling mechanism coupled to the right foldable arm. The left leveling blade can be coupled to the left foldable arm at the left leveling mechanism, and the left leveling mechanism can adjust a height of the left leveling blade above the ground. The right leveling blade can be coupled to the right foldable arm at the right leveling mechanism, the right leveling mechanism can adjust a height of the right leveling blade above the ground. The leveling apparatus can also include a left height sensor that generates left height signals that indicate the height of the left leveling blade above the ground, and a right height sensor that generates right height signals that indicate the height of the right leveling blade above the ground. The processor can receive the left and right height signals. The processor can also perform a height calibration based on the left and right height signals to determine a minimum height for the left and right leveling blades and a maximum height for the left and right leveling blades.

A cut stock measurement method is disclosed for a work machine that cuts stock. The cut stock measurement method includes receiving distance measurements between the work machine and the cut stock from distance sensors; receiving global positioning signals; generating a machine geolocation based on the global positioning signals; computing a stock width measurement for the cut stock based on the distance measurements, and computing a stock geolocation based on the distance measurements and the machine geolocation. The cut stock measurement method can also include comparing the stock width measurement to a critical low row width threshold, and generating a notification when the stock width measurement is less than the critical low row width threshold.

Receiving distance measurements between the work machine and the cut stock from distance sensors can include receiving left distance measurements between a left distance sensor and a left side of the cut stock, and receiving right distance measurements between a right distance sensor and a right side of the cut stock. The left distance sensor can be coupled to a left side of the work machine, and the right distance sensor can be coupled to a right side of the work machine.

Receiving distance measurements between the work machine and the cut stock from distance sensors can include receiving left distance measurements from a left distance sensor coupled to a left foldable arm, and receiving right distance measurements from a right distance sensor coupled to a right foldable arm. The left distance measurements can indicate the distance between the left distance sensor and a left side of the cut stock. The right distance measurements can indicate the distance between a right distance sensor and a right side of the cut stock. The left foldable arm can include a proximal end coupled to the work machine, and a distal end that trails the work machine on a left side as the work machine moves in a forward direction. The right foldable arm can include a proximal end coupled to the work machine, and a distal end that trails the work machine on a right side as the work machine moves in the forward direction.

The cut stock measurement method can include leveling the cut stock using left and right leveling blades. The left leveling blade can include a proximal end coupled to the left foldable arm, and a distal end coupled to a hinge pin. The right leveling blade can include a proximal end coupled to the right foldable arm, and a distal end coupled to the hinge pin. The cut stock measurement can also include adjusting an angle between the left and right leveling blades by moving one of the left and right leveling blades relative to the other at the hinge pin.

The cut stock measurement method can include adjusting a height of the left leveling blade above the ground using a left leveling mechanism coupled to the left foldable arm, and adjusting a height of the right leveling blade above the ground using a right leveling mechanism coupled to the right foldable arm. The left leveling blade can be coupled to the left foldable arm at the left leveling mechanism, and the right leveling blade can be coupled to the right foldable arm at the right leveling mechanism. The cut stock measurement method can also include receiving left and right height signals from left and right height sensors. The left height signals can indicate the height of the left leveling blade above the ground, and the right height signals can indicate the height of the right leveling blade above the ground. The cut stock measurement method can also include a height calibration process that includes automatically completely lowering the left and right leveling blades, computing a minimum blade height using the left and right height signals when the left and right leveling blades are completely lowered, automatically completely raising the left and right leveling blades, and computing a maximum blade height using the left and right height signals when the left and right leveling blades are completely raised.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
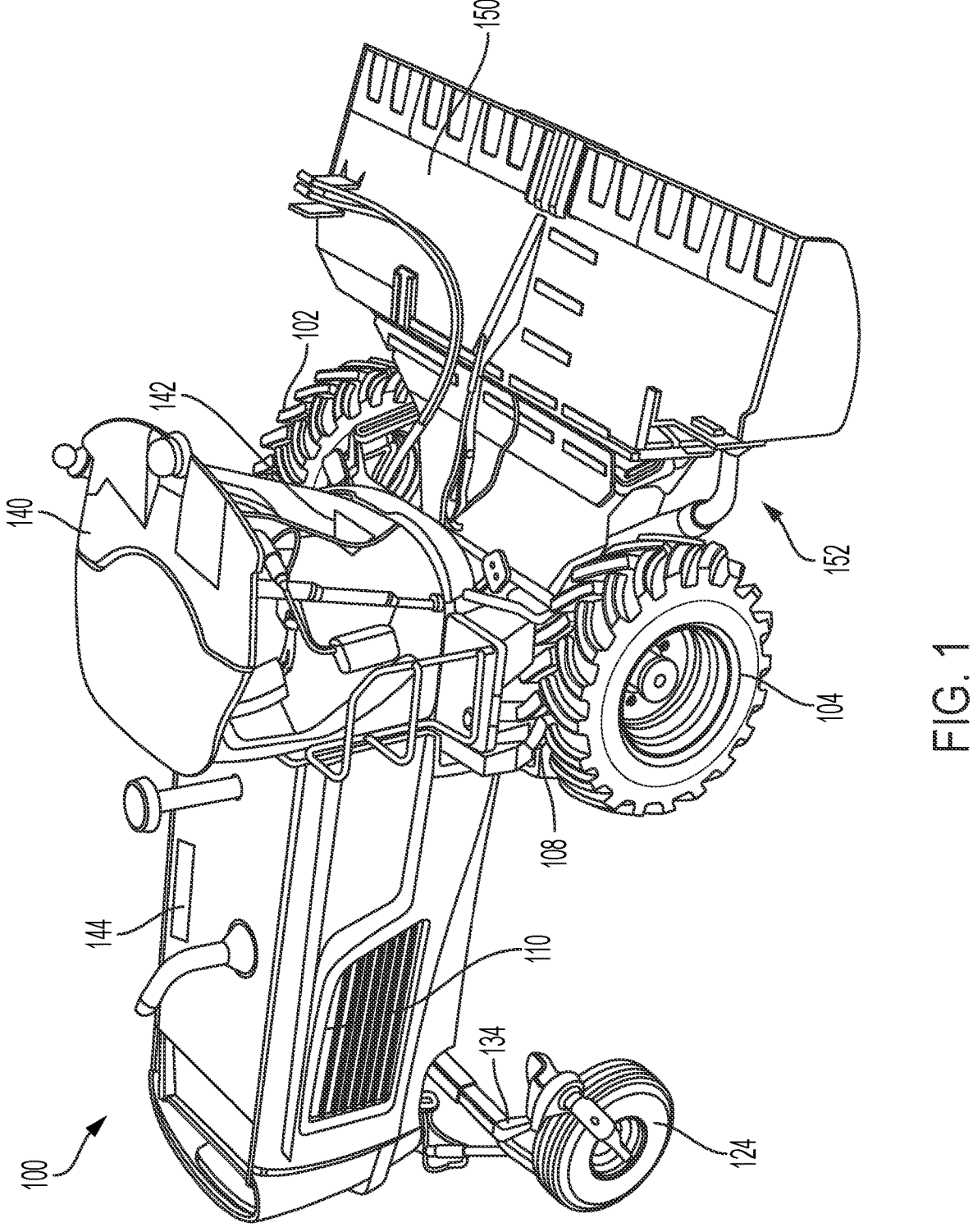
FIG. 1 illustrates a perspective view of a work machine coupled to a head or implement.

FIG. 1 illustrates a perspective view of a work machine 100 coupled to a head or implement 150. The work machine 100 may have a power unit 110 that provides mechanical, electrical and hydraulic power to the work machine 100, and can provide power to rotate left and right drive wheels 102, 104 coupled to a frame 108 of the work machine 100. The drive wheels 102, 104 may rotate relative to the work machine 100 to allow the work machine 100 to traverse an underlying or ground surface. In addition to drive wheels 102, 104, the work machine 100 can have left and right swivel caster wheels 122, 124. However, the particular configuration of the drive wheels 102, 104 and caster wheels 122, 124 should not be limiting. In a different embodiment, there may be no wheels at all. Rather, the power unit 110 may provide power to tracks to allow the work machine 100 to traverse the underlying surface. In yet another embodiment, the caster wheels 122, 124 may not be swivel caster wheels but rather be wheels coupled to an axle and configured to be mechanically coupled to the power unit 110.

Figure 2:
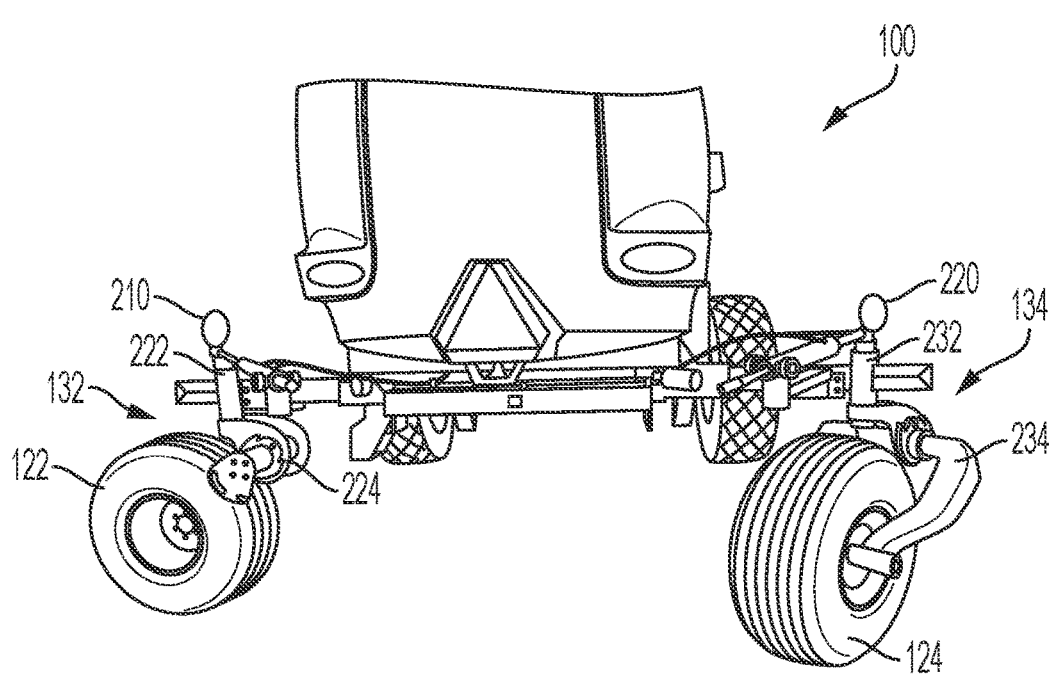
FIG. 2 illustrates an exemplary placement of left and right distance sensors coupled to stationary portions of left and right caster wheel mounts on the machine.

As shown in FIG. 2, the left caster wheel 122 may pivot freely about a left caster mount 132, and the right caster wheel 124 may pivot freely about a right caster mount 134. The left caster mount 132 includes a stationary portion 222 coupled to the frame 108, and a pivoting portion 224 coupled to the left caster wheel 122 to allow the left caster wheel 122 to swivel relative to the frame 108 as directed by the powered drive wheels 102, 104. The right caster mount 134 includes a stationary portion 232 coupled to the frame 108, and a pivoting portion 234 coupled to the right caster wheel 124 to allow the right caster wheel 124 to swivel relative to the frame 108 as directed by the powered drive wheels 102, 104.

The work machine 100 may also have a cabin 140 coupled to the frame 108, and an implement mounting and positioning system 152 that can include lift arms, brackets, actuators and other mechanisms to connect and control the implement 150. The cabin 140 may house a plurality of controls 142 that allow a user to control the various systems of the work machine 100 and the implement 150. In one non-exclusive embodiment, the plurality of controls 142 are coupled to a control system 144 that monitors and sends control signals to various mechanical, electrical, and hydraulic systems of the work machine 100 and the implement 150. The plurality of controls 142 may be positioned in the cabin 140 and may include one or more touch screens, knobs, buttons, levers, or any other devices capable of identifying a user input.

Distance or ranging sensors can be used to determine the position of the stock harvested by the work machine 100. FIG. 2 illustrates an exemplary placement of left and right distance sensors 210, 220 on the machine 100. In this embodiment, the left distance sensor 210 is mounted on the stationary portion 222 of the left caster wheel mount 132, and the right distance sensor 220 is mounted on the stationary portion 232 of the right caster wheel mount 134. This design uses two distance sensors 210, 220 on opposite sides of the machine 100, where the distance sensors 210, 220 are mounted to the existing rigid frame of the machine 100 on the stationary portions 222, 232 of the left and right caster wheel mounts 132, 134. The left distance sensor 210 provides distance measurements to the left side of stock cut by the machine 100, and the right distance sensor 220 provides distance measurements to the right side of stock cut by the machine 100. The width of the cut stock can be calculated using the known distance between the two sensors 210, 220; and the distance readings from the left distance sensor 210 of the distance between the left distance sensor 210 and the left edge of the cut stock; and the distance readings from the right distance sensor 220 of the distance between the right distance sensor 220 and the right edge of the cut stock.

Figure 3:
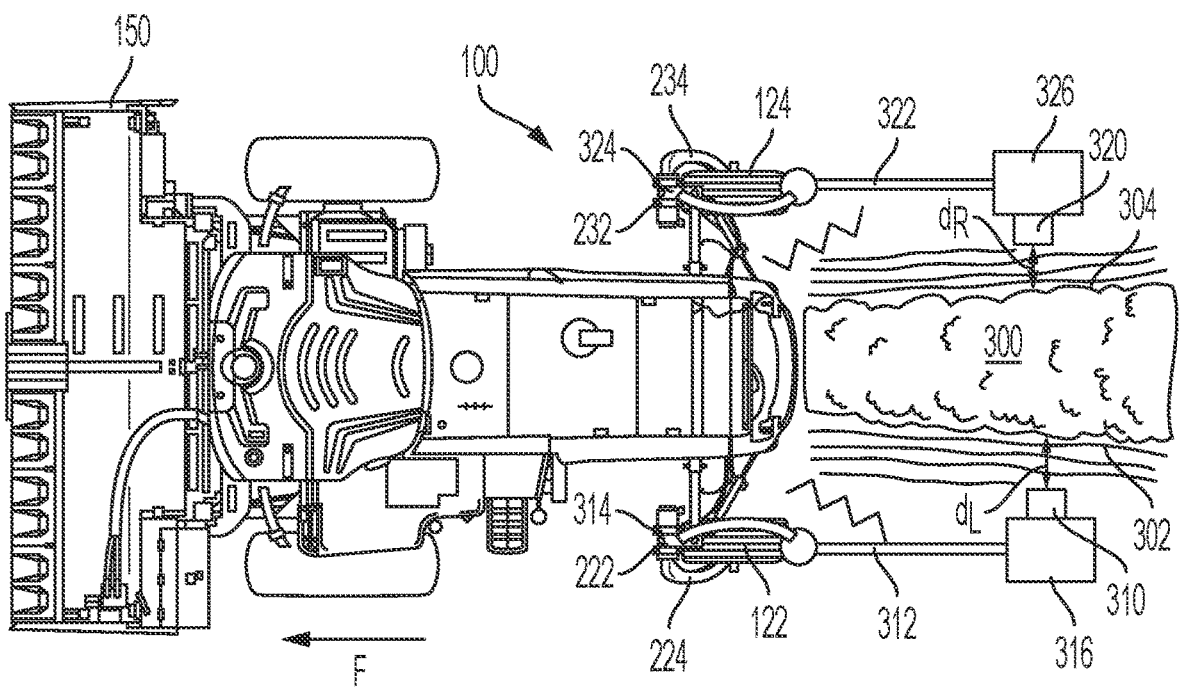
FIG. 3 illustrates an alternative placement of left and right distance sensors coupled to left and right foldable arms that are coupled to the machine.

FIG. 3 illustrates an alternative placement of left and right distance sensors 310, 320 coupled to left and right foldable, trailing arms 312, 322 that are coupled to the machine 100. In this embodiment, the left foldable arm 312 has a proximal end 314 and a distal end 316, and the right foldable arm 322 has a proximal end 324 and a distal end 326. The proximal end 314 of the left foldable arm 312 is coupled to a left side of the machine 100, and the proximal end 324 of the right foldable arm 322 is coupled to a right side of the machine 100. In the embodiment shown, the proximal end 314 of the left foldable arm 312 is coupled to the stationary portion 222 of the left caster mount 132, and the proximal end 324 of the right foldable arm 322 is coupled to the stationary portion 232 of the right caster mount 134. The left distance sensor 310 is coupled at or near the distal end 316 of the left foldable arm 312, and the right distance sensor 320 is coupled at or near the distal end 326 of the right foldable arm 322. The left distance sensor 310 provides distance measurements to a left side 302 of the stock 300 cut by the implement 150, and the right distance sensor 320 provides distance measurements to a right side 304 of the stock 300 cut by the implement 150. In FIG. 3, the forward direction of the work machine 100 is indicated by the arrow F.

This design uses two distance sensors 310, 320 on opposite sides of the machine 100, where the distance sensors 310, 320 are mounted to the foldable frames 312, 322 coupled to the machine 100. The foldable frames 312, 322 can fold for transport and in some embodiments may be adjustable laterally to adjust the width between the arms 312, 322 and thus the distance between the distance sensors 310, 320. The distance sensors 310, 320 can be mounted at or near the distal ends 316, 326 or anywhere along the length of the left and right foldable arms 312, 322. The left distance sensor 310 provides distance measurements di to the left side 302 of the cut stock 300, and the right distance sensor 320 provides distance measurements dr to the right side 304 of the cut stock 300. The width of the cut stock 300 can be calculated using the known distance between the two sensors 310, 320; and the distance readings from the left distance sensor 310 of the distance between the left distance sensor 310 and the left edge 302 of the cut stock 300; and the distance readings from the right distance sensor 320 of the distance between the right distance sensor 320 and the right edge 304 of the cut stock 300.

The distance sensors can also be mounted at or coupled to other locations on the machine 100 and/or the implement 150 than those shown in FIGS. 2 and 3. The distance sensors 210, 220, 310, 320 can be any of various types including, for example, ultrasonic, Lidar, radar, laser, etc.

Figure 4:
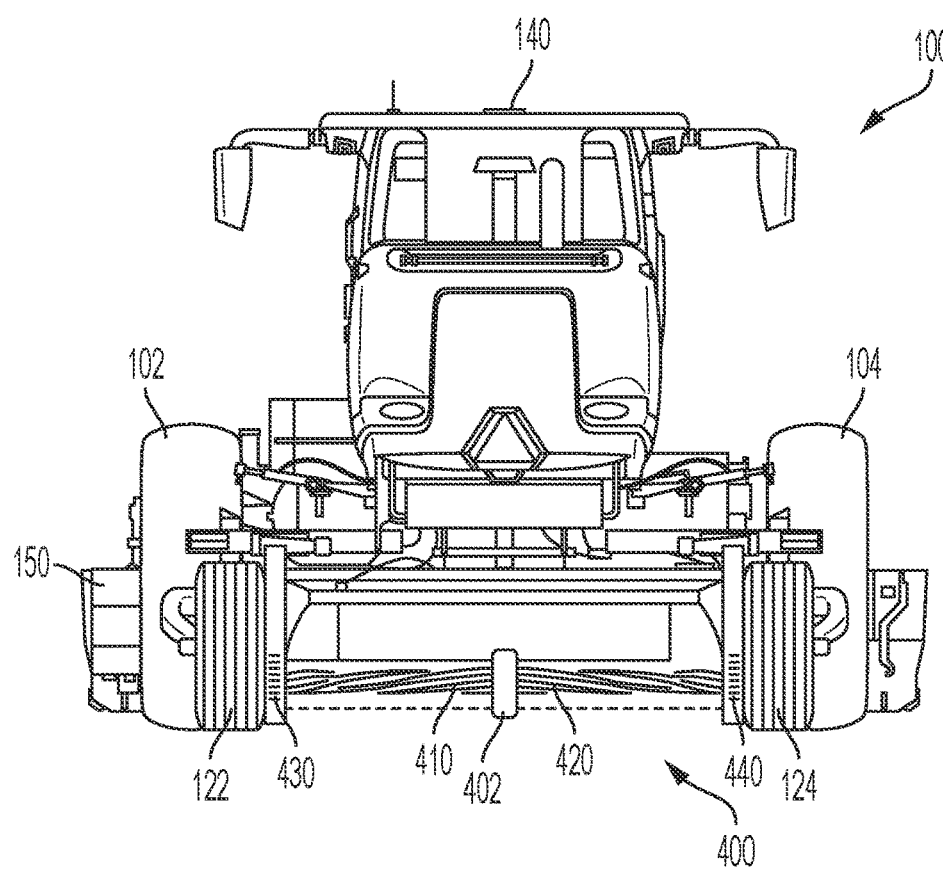
FIG. 4 illustrates a rear view of an embodiment of the work machine with left and right leveling blades coupled to left and right foldable arms.
Figure 5:
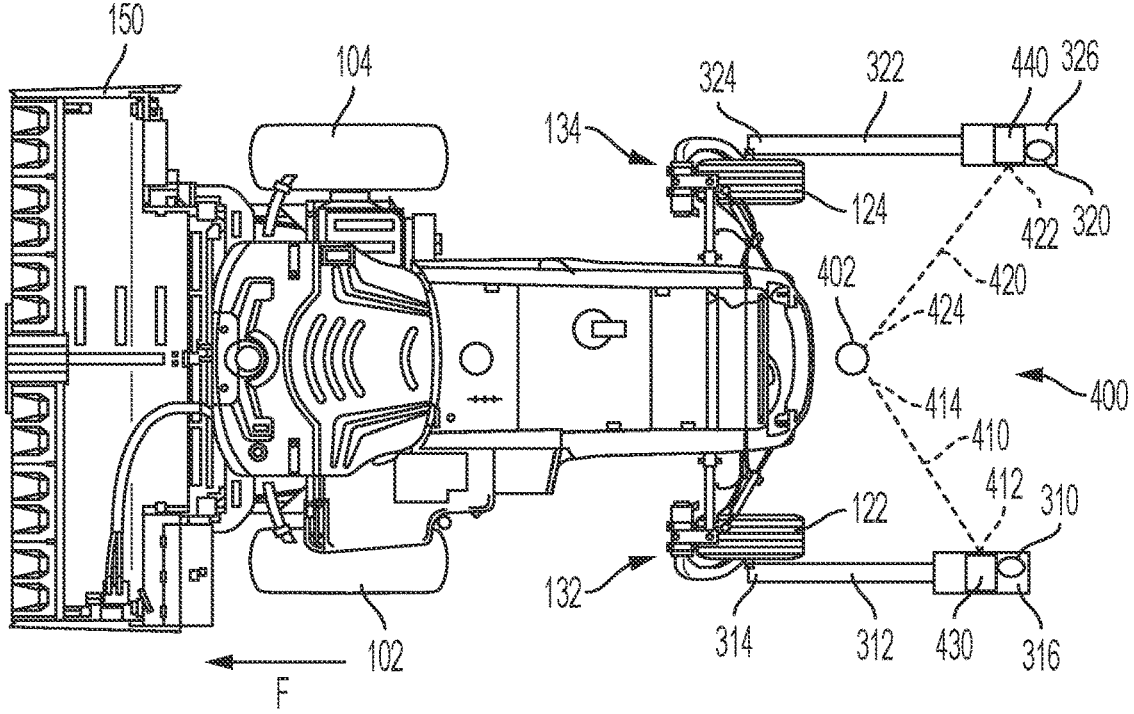
FIG. 5 illustrates a top view of the embodiment of the work machine with left and right leveling blades coupled to left and right foldable arms.

FIGS. 4 and 5 illustrate an embodiment of the work machine 100 that also includes a leveling apparatus 400 with left and right leveling blades 410, 420 coupled to the left and right foldable arms 312, 322. The left leveling blade 410 has a proximal end 412 and a distal end 414, and the right leveling blade 420 has a proximal end 422 and a distal end 424. The left and right leveling blades 410, 420 can be flat blades. The proximal ends 412, 422 of the left and right leveling blades 410, 420 are coupled to the distal ends 316, 326 of the left and right foldable arms 312, 322, respectively. The distal ends 414, 424 of the left and right leveling blades 410, 420 are coupled to one another at a hinge pin 402. In FIG. 5, the forward direction of the work machine 100 is indicated by the arrow F.

Figure 6:
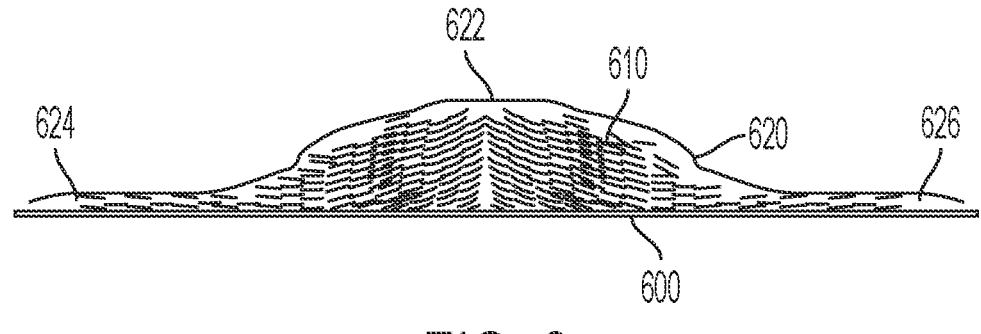
FIG. 6 illustrates the height profile of cut stock laying on the ground without the use of leveling blades.
Figure 7:
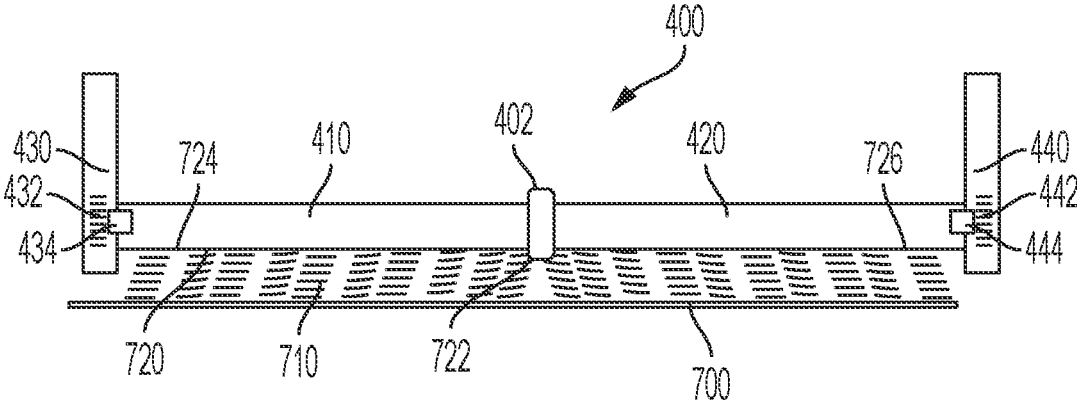
FIG. 7 illustrates the height profile of cut stock laying on the ground with the use of the leveling blades.

A left leveling mechanism 430 is coupled to the proximal end 412 of the left leveling blade 410, and a right leveling mechanism 440 is coupled to the proximal end 422 of the right leveling blade 420. The left and right leveling mechanisms 430, 440 can be used to adjust the heights above the ground of the left and right leveling blades 410, 420, respectively. The left and right leveling blades 410, 420 can be used to create a more even or uniform spread of the cut stock. FIG. 6 illustrates the height profile 620 of cut stock 610 laying on the ground 600 without the use of leveling blades. The height profile 620 of the cut stock 610 is higher in the middle 622 and lower at the left and right edges 624, 626. This uneven stock distribution results in uneven moisture content and different drying times for the cut stock 610. FIG. 7 illustrates the height profile 720 of cut stock 710 laying on the ground 700 with the use of the leveling blades 410, 420. The height profile 720 of the cut stock 710 shows a uniform height across the middle 722, left edge 724 and right edge 726. This uniform stock distribution results in more even moisture content and more uniform drying times for the cut stock 710.

The angle between the left and right leveling blades 410, 420 can be adjusted by moving the left and right leveling blades 410, 420 relative to one another at the hinge pin 402 To help prevent uneven stock distribution or stock piling up in one section such as the middle, the leveling blades 410, 420 can be inclined towards the front of machine 100 as shown in FIG. 5. The angular position of the leveling blades 410, 420 can help spread the cut stock 710 from the middle 722 towards the left and right edges 724, 726.

The left and right leveling mechanisms 430, 440 can work with the hinge pin 402 to manually or automatically raise and lower the leveling blades 410, 420. Manual left and right leveling mechanisms 430, 440 can enable an operator to manually raise and lower the heights of the left and right leveling blades 410, 420 and then use a securing mechanism (for example, a stop-pin, cotter pin, latch, etc.) on each of the leveling mechanisms 430, 440 to keep the left and right leveling blades 410, 420 at the selected heights. Automatic left and right leveling mechanisms 430, 440 can include actuators to enable an operator to raise and lower the heights of the left and right leveling blades 410, 420 using the plurality of controls 142 in the cab 140, and to set the left and right leveling blades 410, 420 at the desired heights. The left and right leveling mechanisms 430, 440 can include height markings 432, 442 to more easily identify the selected heights. The left and right leveling mechanisms 430, 440 can include height sensors 434, 444 that monitor the heights of the left and right leveling blades 410, 420, respectively. The height sensors 434, 444 can send the current height readings to a display or other device for operator monitoring.

Figure 8:
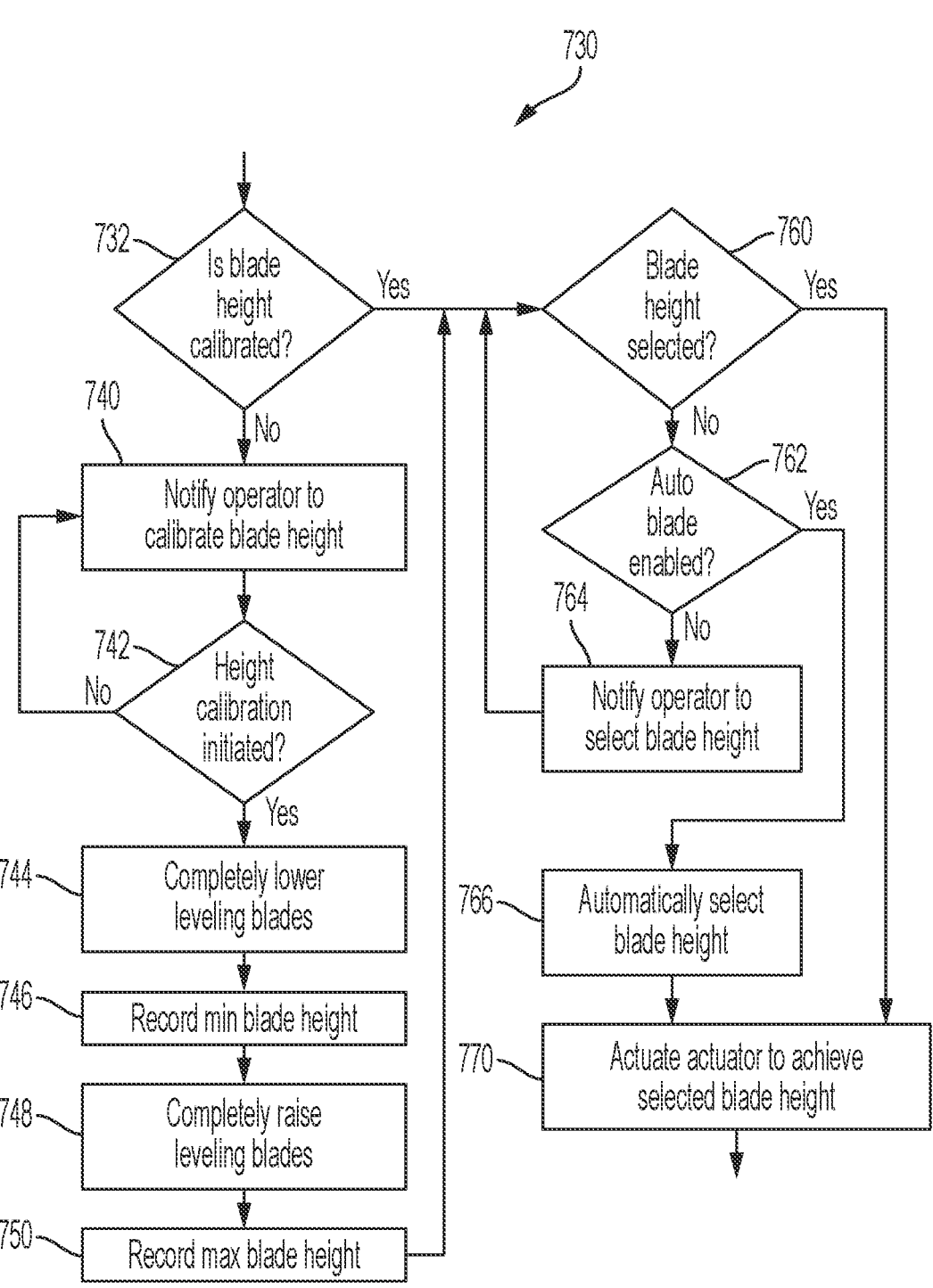
FIG. 8 illustrates an exemplary height calibration and selection process.

The left and right leveling mechanisms 430, 440 can also include an automatic height calibration system. The height calibration system can use the height sensors 434, 444 in determining maximum and minimum heights for the left and right leveling blades 410, 420. FIG. 8 illustrates an exemplary height calibration and selection process 730. The exemplary height calibration process is performed in blocks 740-750, and the exemplary height selection process is performed in blocks 760-770.

At block 732, the system checks if the blade height has been calibrated. If the blade height has already been calibrated, then control passes to the start of the height selection process in block 760. If the blade height has not been calibrated, then control passes to the start of the height calibration process in block 740.

At block 740, the system notifies the operator to calibrate the blade height. The notification can be a message to an onboard display, or some other visual or an audible notification. Then control passes to block 742.

At block 742, the system checks if the blade height calibration has been initiated. When the blade height calibration is initiated, then control passes to block 744. If the blade height calibration has not been initiated, then control passes back to block 740 to await operator initiation of the calibration process.

In blocks 744-750 the system performs a height calibration for the leveling blades 410, 420. At block 744, the system activates the leveling blade actuators to completely lower the leveling blades 410, 420. The leveling blades 410, 420 can be considered completely lowered when they hit the ground or an underlying surface that prevents further lowering, or when they reach the bottom of the leveling mechanisms, or for other reason that prevents further lowering of the leveling blades 410, 420. Then at block 746, the system records the readings of the height sensors 434, 444 when the leveling blades 410, 420 are completely lowered as the minimum heights for the leveling blades 410, 420. Then at block 748, the system activates the leveling blade actuators to completely raise the leveling blades 410, 420. The leveling blades 410, 420 can be considered completely raised when they hit the top of the leveling mechanisms, or for other reason that prevents further raising of the leveling blades 410, 420. Then at block 750, the system records the readings of the height sensors 434, 444 when the leveling blades 410, 420 are completely raised as the maximum heights for the leveling blades 410, 420. Once the minimum and maximum heights for the leveling blades 410, 420 are recorded, control passes to the height selection process at block 760.

At block 760, the system checks if a blade height has been selected. The system can check to make sure that the selected blade height is within the calibrated range between the minimum and maximum heights found during the height calibration process. If the selected blade height is outside the calibrated range, then the system can require the operator to select a new blade height within the calibrated range. Alternatively, if the selected blade height is greater than the maximum height found during the height calibration process then the system can set the selected blade height to the maximum height, and if the selected blade height is less than the minimum height found during the height calibration process then the system can set the selected blade height to the minimum height. Once an acceptable blade height is selected, then control passes to block 770. If the blade height is not acceptable or has not been selected, then control passes back to block 762.

At block 762, the system checks if an optional auto-height adjustment has been enabled. If auto-height adjustment is enabled, then control passes to block 766. If auto-height adjustment is not enabled, then control passes to block 764.

At block 764, the system notifies the operator to select a height for the leveling blades 410, 420. The notification can be a message to an onboard display, or some other visual or an audible notification. The system can wait at block 764 until the user selects a height for the leveling blades 410, 420, or can return to block 760.

At block 766, the auto-height adjustment procedure for the leveling blades 410, 420 is performed. The auto-height adjustment procedure can automatically calculate and select a blade height based on stock width, crop density, machine speed, and other factors affecting stock cutting, row widths and row heights. The auto-height adjustment procedure is configured to select a desired blade height within the calibrated range between the minimum and maximum heights found during the height calibration process. After the auto-height adjustment procedure automatically selects a blade height, control passes back to block 770.

At block 770, the system activates the actuators to position the height of the leveling blades 410, 420 at the selected height.

Figure 9:
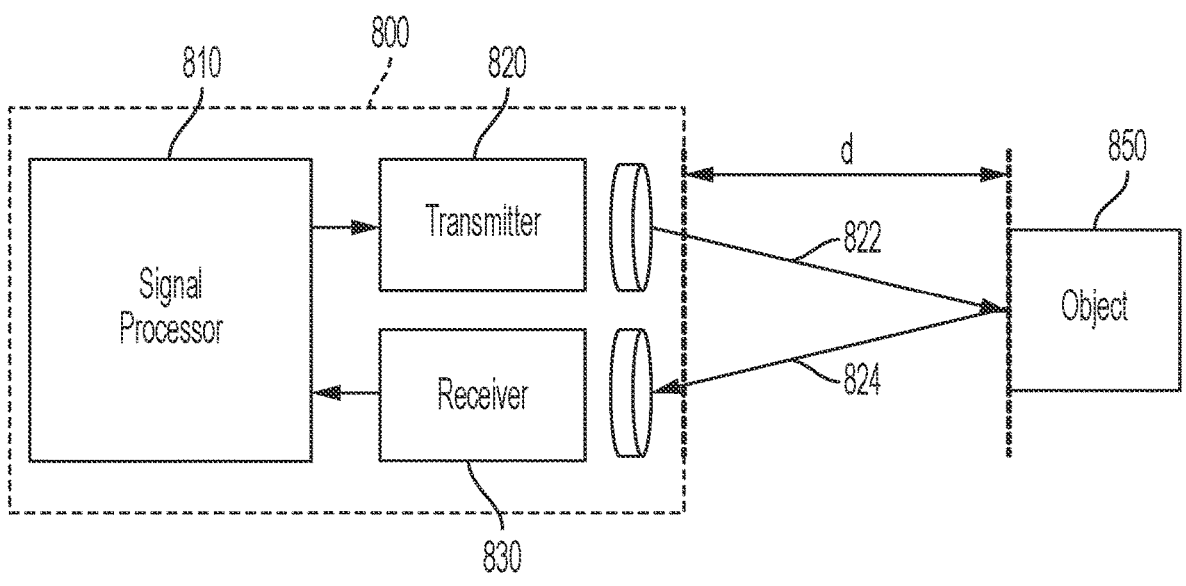
FIG. 9 illustrates a block diagram of an exemplary distance sensor that can be used to provide distance measurements to an object.

FIG. 9 illustrates a block diagram of an exemplary distance sensor 800 that can be used for the distance sensors 210, 220, 310, 320 to provide distance measurements to an object 850. The sensor 800 includes a signal processor 810, a transmitter 820 and a receiver 830. The transmitter 820 transmits a transmitted signal 822 that is reflected by the object 850 as a reflected signal 824. The reflected signal 824 is received by the receiver 830. The signal processor 810 uses the parameters of the transmitted and received signals 822, 824, including the time difference, and determines a distance d between the sensor 800 and the object 850.

Figure 10:
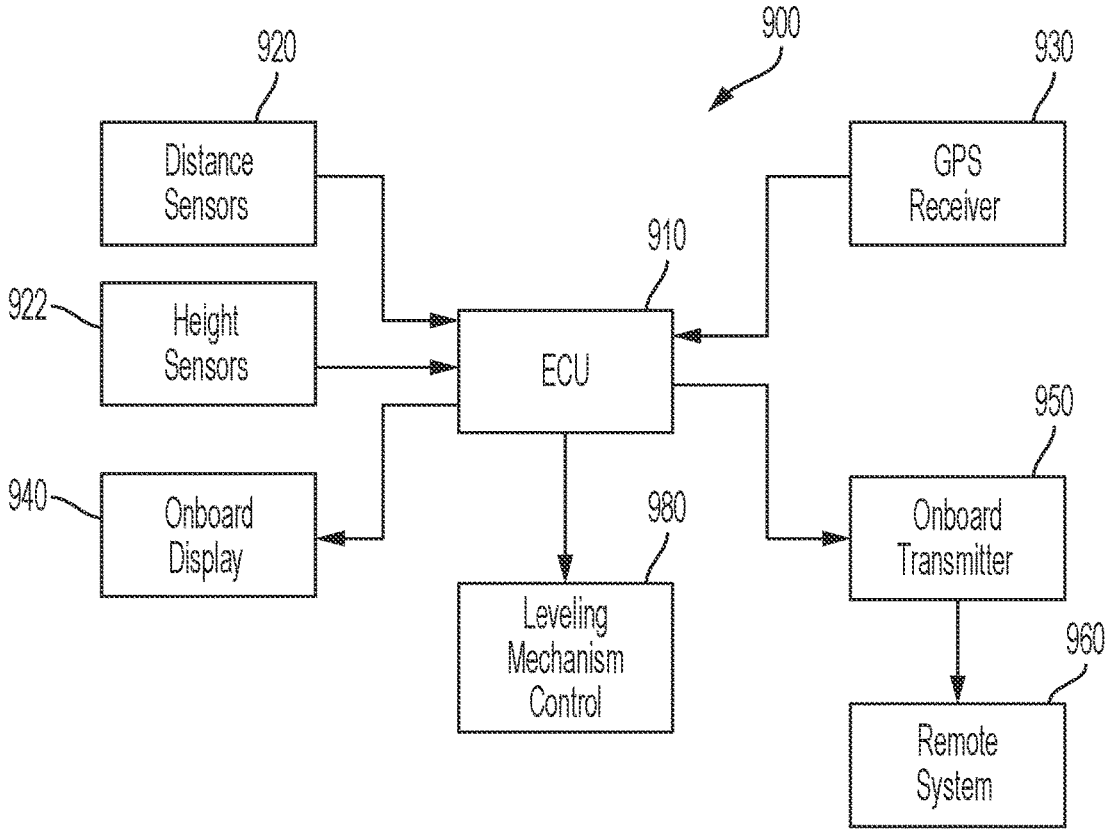
FIG. 10 illustrates an exemplary electrical system block diagram of a stock measurement system coupled to the control system of the work machine.
Figure 11:
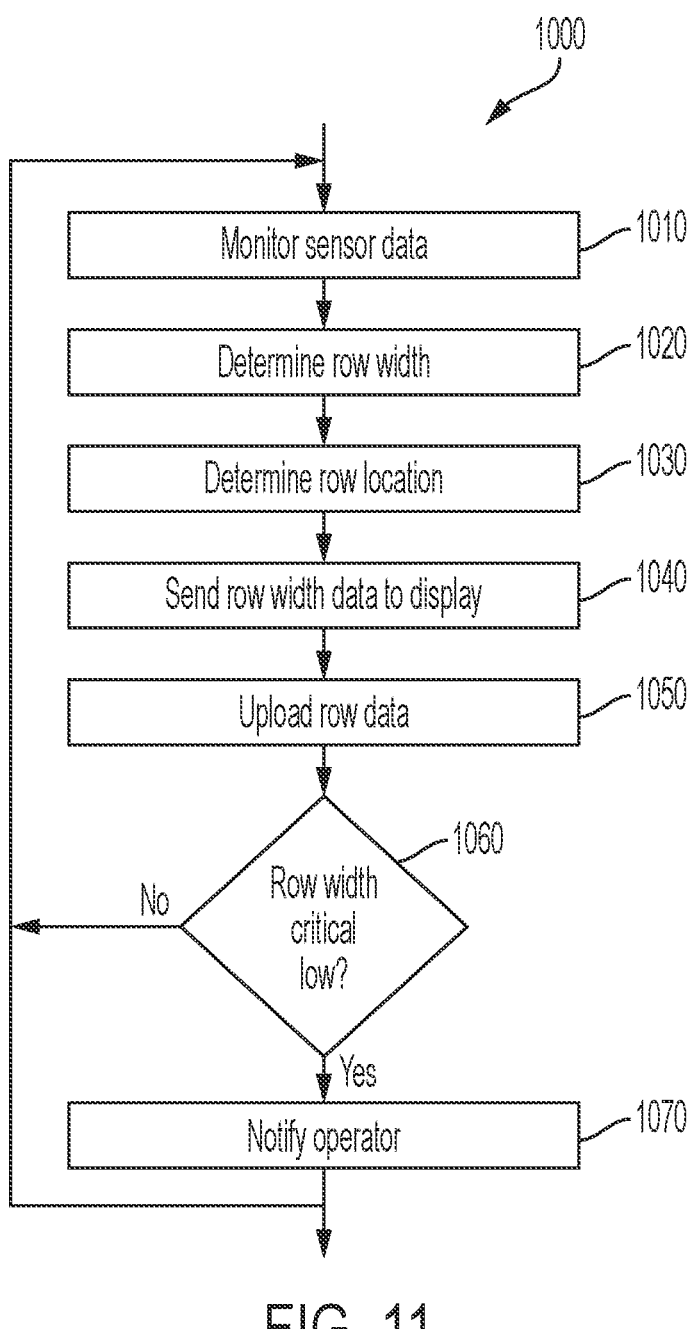
FIG. 11 illustrates an exemplary flow diagram for a stock measurement system.

FIG. 10 illustrates an exemplary electrical system block diagram of a stock distribution system 900 coupled to the control system 144 of the work machine 100; and FIG. 11 illustrates an exemplary flow diagram 1000 for a stock distribution system. The stock distribution system 900 includes an electronic control unit (ECU) 910, distance sensors 920, a GPS receiver 930, on onboard display 940 and an onboard transmitter 950. The stock distribution system 900 can also include height sensors 922 and a leveling mechanism control 980 to adjust the leveling mechanisms 430, 440. The onboard transmitter 950 can be used to send data to and receive data from a remote system 960. The stock distribution system 900 processing can be performed on the ECU 910 of the control system 144 of the work machine 100.

At block 1010, the stock distribution system can continuously monitor distance signals from one or more distance sensors 920. The distance sensors 920 can include the distance sensors 210, 220 and/or 310, 320 shown in FIGS.

2 and 3. The stock distribution system and/or ECU can also receive global positioning signals from a GPS receiver 930. The stock distribution system can also monitor the height readings from the height sensors 922 that monitor the heights of the left and right leveling blades 410, 420.

At block 1020, the stock distribution system can determine the row width or the distance between the left and right sides of the cut stock using the distance sensors 920 and the known locations of the distance sensors relative to the machine 100. For example using the embodiment illustrated in FIG. 3, the stock distribution system can use the distance signals from the left distance sensor 310 to determine the distance from the left distance sensor 310 to the left side 302 of the cut stock 300, and can use the distance signals from the right distance sensor 320 to determine the distance from the right distance sensor 320 to the right side 304 of the cut stock 300. Also using the known locations of the left and right distance sensors 310, 320 relative to the foldable arms 312, 322 and the machine 100, the stock measurement system can determine the row width or the distance between the left and right sides 302, 304 of the cut stock 300. Measuring the width of the windrowed stock 300 helps to maintain a known and more uniform distribution so the baler can more effectively collect the harvest. The width of the windrowed stock 300 depends upon many factors including the speed of the machine 100 and the density of the crop growth.

At block 1030, the stock distribution system can use global positioning signals from the GPS receiver 930, to determine the geolocation of the machine 100 and the geolocation of the row. For example using the embodiment illustrated in FIG. 3, the stock measurement system can determine the geolocation of the machine 100 using the received global positioning signals. The stock measurement system can then determine the geolocation of each of the distance sensors 310, 320 using the known locations of each of the distance sensors relative to the location of the GPS receiver 930. The stock measurement system can then determine the geolocation of the left and right sides 302, 304 of the row 300 using the distances calculated in block 1020, and can determine other geolocation parameters of the row 300, for example the center of the row 300.

At block 1040, the stock distribution system can send the row width data and the row location data to the onboard display 940 of the machine 100 for operator use and monitoring of the cutting process. At block 1050, the stock distribution system can use the onboard transmitter 950 to send the row width data and the row location data to one or more remote systems 960 for monitoring of the cutting process and for later use during the baling process. The stock distribution system can also send row height data to the onboard display 940 of the machine 100, and use the onboard transmitter 950 to send the row height data to one or more remote systems 960.

At block 1060, the stock distribution system can check whether the row width has gone below a critical low row width threshold. The critical low row width threshold can be set by the user. The stock measurement system can compare the row width calculated at block 1020 with the critical low row width threshold. If the row width calculated at block 1020 is less than or equal to the critical low row width threshold, then control passes to block 1070. If the row width calculated at block 1020 is greater than the critical low row width threshold, then control passes back to block 1010.

If the row width calculated at block 1020 is less than or equal to the critical low row width threshold, then at block 1070 the stock distribution system sends a notification to the operator of a critical low row width. The notification can be a message on the onboard display 940, some other visual notification (for example a warning light) or an audible notification (for example a chime or alarm). The operator can adjust the speed and or the path of the machine 100 to try to increase the width of the row of cut stock. At block 1070, the stock distribution system can also send a notification to the remote system 960. After sending the notification, control can pass back to block 1010.

In an alternative embodiment, the field to be cut can be examined before cutting to determine the crop density and other factors affecting stock cutting, row widths and row heights. Row widths and heights of the cut stock can be predicted from the data collected before the cutting. Then the stock distribution system can compare the predicted row width to the actual row width measured using the distance sensors at block 1020, and can keep the operator advised of the differences and/or notify the operator if the differences exceed a preset difference threshold. The operator can adjust the speed and or the path of the machine 100 to try to decrease the differences between the predicted row width and the actual measured row width.

The stock distribution system can provide consistent monitoring and storing of data on the width of the cut stock. The sensors can be installed and the stock distribution system implemented as an aftermarket feature, and can provide accurate width measurements and/or height control with minimal complexity in calibration. Computing geotags and row widths and heights for the cut stock can help in the sequential baling operation.

While the disclosure has been illustrated and described in detail in the drawings and foregoing description, such illustration and description is to be considered as exemplary and not restrictive in character, it being understood that illustrative embodiment(s) have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

We claim:

1. A cut stock measurement system for a work machine, the cut stock measurement system comprising:
   a plurality of distance sensors configured to generate distance measurements between the work machine and the cut stock;
   a geolocation unit configured to receive global positioning signals and generate a machine geolocation;
   a processor configured to receive the distance measurements and the machine geolocation, to compute a stock width measurement for the cut stock based on the distance measurements, and to compute a stock geolocation based on the distance measurements and the machine geolocation.

2. The cut stock measurement system of claim 1, wherein the plurality of distance sensors comprise:
   a left distance sensor coupled to a left side of the work machine and configured to generate distance measurements between the left distance sensor and a left side of the cut stock; and a right distance sensor coupled to a right side of the work machine and configured to generate distance measurements between the right distance sensor and a right side of the cut stock.

3. The cut stock measurement system of claim 2, wherein:

the left distance sensor is coupled to a stationary portion of a left rear wheel mount of the work machine; and the right distance sensor is coupled to a stationary portion of a right rear wheel mount of the work machine.

4. The cut stock measurement system of claim 2, wherein the processor is further configured to compare the stock width measurement to a critical low row width threshold, and generate a notification when the stock width measurement is less than the critical low row width threshold.

5. The cut stock measurement system of claim 1, further comprising:

a left foldable arm that includes a proximal end coupled to the work machine and a distal end configured to trail the work machine on a left side as the work machine moves in a forward direction; and a right foldable arm that includes a proximal end coupled to the work machine and a distal end configured to trail the work machine on a right side as the work machine moves in the forward direction; and wherein the plurality of distance sensors comprise:

a left distance sensor coupled to the left foldable arm and configured to generate distance measurements between the left distance sensor and a left side of the cut stock; and a right distance sensor coupled to the right foldable arm and configured to generate distance measurements between the right distance sensor and a right side of the cut stock.

6. The cut stock measurement system of claim 5, wherein the left foldable arm is coupled to a left rear wheel mount of the work machine; and the right foldable arm is coupled to a right rear wheel mount of the work machine.

7. The cut stock measurement system of claim 5, further comprising a leveling apparatus comprising:

a left leveling blade that includes a proximal end coupled to the left foldable arm and a distal end coupled to a hinge pin; and a right leveling blade that includes a proximal end coupled to the right foldable arm and a distal end coupled to the hinge pin.

8. The cut stock measurement system of claim 7, wherein an angle between the left and right leveling blades is adjustable by moving one of the left and right leveling blades relative to the other at the hinge pin.

9. The cut stock measurement system of claim 7, wherein the leveling apparatus further comprises:

a left leveling mechanism coupled to the left foldable arm; and a right leveling mechanism coupled to the right foldable arm;

wherein the left leveling blade is coupled to the left foldable arm at the left leveling mechanism, and the right leveling blade is coupled to the right foldable arm at the right leveling mechanism; and wherein the left leveling mechanism is configured to adjust a height of the left leveling blade above the ground, and the right leveling mechanism is configured to adjust a height of the right leveling blade above the ground.

10. The cut stock measurement system of claim 9, wherein the leveling apparatus further comprises:

a left height sensor configured to generate left height signals that indicate the height of the left leveling blade above the ground; and a right height sensor configured to generate right height signals that indicate the height of the right leveling blade above the ground; and wherein the processor is further configured to receive the left and right height signals.

11. The cut stock measurement system of claim 10, wherein the processor is further configured to perform a height calibration based on the left and right height signals to determine a minimum height for the left and right leveling blades and a maximum height for the left and right leveling blades.

12. A method comprising:

cutting stock by a work machine in a field;

receiving distance measurements between the work machine and the cut stock from a plurality of distance sensors;

receiving global positioning signals;

generating, by an electronic control unit, a machine geolocation based on the global positioning signals;

computing, by the electronic control unit, a stock width measurement for the cut stock based on the distance measurements, and computing, by the electronic control unit, a stock geolocation based on the distance measurements and the machine geolocation.

13. The cut stock measurement method of claim 12, wherein receiving distance measurements between the work machine and the cut stock from the plurality of distance sensors comprises:

receiving left distance measurements between a left distance sensor and a left side of the cut stock, the left distance sensor being coupled to a left side of the work machine; and receiving right distance measurements between a right distance sensor and a right side of the cut stock, the right distance sensor being coupled to a right side of the work machine.

14. The cut stock measurement method of claim 13, further comprising:

comparing the stock width measurement to a critical low row width threshold; and generating a notification when the stock width measurement is less than the critical low row width threshold.

15. The cut stock measurement method of claim 12, wherein receiving distance measurements between the work machine and the cut stock from the plurality of distance sensors comprises:

receiving left distance measurements between a left distance sensor and a left side of the cut stock, the left distance sensor being coupled to a left foldable arm; and receiving right distance measurements between a right distance sensor and a right side of the cut stock, the right distance sensor being coupled to a right foldable arm;

wherein the left foldable arm includes a proximal end coupled to the work machine and a distal end configured to trail the work machine on a left side as the work machine moves in a forward direction; and the right foldable arm includes a proximal end coupled to the work machine and a distal end configured to trail the work machine on a right side as the work machine moves in the forward direction.

16. The cut stock measurement method of claim 15, further comprising:

leveling the cut stock using left and right leveling blades;

wherein the left leveling blade includes a proximal end coupled to the left foldable arm and a distal end coupled to a hinge pin; and the right leveling blade includes a proximal end coupled to the right foldable arm and a distal end coupled to the hinge pin.

17. The cut stock measurement method of claim 16, further comprising:

adjusting an angle between the left and right leveling blades by moving one of the left and right leveling blades relative to the other at the hinge pin.

18. The cut stock measurement method of claim 16, further comprising:

adjusting a height of the left leveling blade above the ground using a left leveling mechanism coupled to the left foldable arm; and adjusting a height of the right leveling blade above the ground using a right leveling mechanism coupled to the right foldable arm;

wherein the left leveling blade is coupled to the left foldable arm at the left leveling mechanism, and the right leveling blade is coupled to the right foldable arm at the right leveling mechanism.

19. The cut stock measurement method of claim 18, further comprising:

receiving left height signals from a left height sensor, the left height signals indicating the height of the left leveling blade above the ground; and receiving right height signals from a right height sensor, the right height signals indicating the height of the right leveling blade above the ground.

20. The cut stock measurement method of claim 19, further comprising a height calibration process comprising:

automatically completely lowering the left and right leveling blades;

computing a minimum blade height using the left and right height signals when the left and right leveling blades are completely lowered;

automatically completely raising the left and right leveling blades; and computing a maximum blade height using the left and right height signals when the left and right leveling blades are completely raised.

* * * * *